(12) United States Patent
Kaul et al.

(10) Patent No.: US 8,947,800 B2
(45) Date of Patent: Feb. 3, 2015

(54) THERMALLY-RESILIENT, BROADBAND OPTICAL ABSORBER FROM UV-TO-IR DERIVED FROM CARBON NANOSTRUCTURES AND METHOD OF MAKING THE SAME

(75) Inventors: Anupama B. Kaul, Arcadia, CA (US); James B. Coles, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 290 days.

(21) Appl. No.: 13/323,905

(22) Filed: Dec. 13, 2011

(65) Prior Publication Data
US 2012/0262809 A1 Oct. 18, 2012

Related U.S. Application Data

(60) Provisional application No. 61/422,330, filed on Dec. 13, 2010.

(51) Int. Cl.
| | |
|---|---|
| *G02B 5/22* | (2006.01) |
| *B82Y 20/00* | (2011.01) |
| *G02B 5/00* | (2006.01) |
| *B82Y 40/00* | (2011.01) |
| *C01B 31/02* | (2006.01) |

(52) U.S. Cl.
CPC ............... *B82Y 20/00* (2013.01); *G02B 5/003* (2013.01); *B82Y 40/00* (2013.01); *C01B 31/0233* (2013.01); *G02B 2207/101* (2013.01); *C01B 2202/08* (2013.01)
USPC .......................................... 359/887; 359/885

(58) Field of Classification Search
USPC ............. 359/350, 361, 885, 887; 257/E51.04
See application file for complete search history.

(56) References Cited

U.S. PATENT DOCUMENTS

| | | | | |
|---|---|---|---|---|
| 4,252,865 A | * | 2/1981 | Gilbert et al. ................. | 428/611 |
| 2002/0151170 A1 | * | 10/2002 | Maex et al. .................... | 438/638 |
| 2006/0251996 A1 | * | 11/2006 | Bogerd et al. ................. | 430/323 |
| 2007/0166999 A1 | * | 7/2007 | Vaartstra ....................... | 438/627 |
| 2007/0259128 A1 | * | 11/2007 | Parsapour ..................... | 427/569 |
| 2008/0305248 A1 | * | 12/2008 | Liang ............................. | 427/77 |

* cited by examiner

*Primary Examiner* — William Choi
*Assistant Examiner* — Sharrief Broome
(74) *Attorney, Agent, or Firm* — Milstein Zhang & Wu LLC; Joseph B. Milstein

(57) ABSTRACT

A monolithic optical absorber and methods of making same. The monolithic optical absorber uses an array of mutually aligned carbon nanotubes that are grown using a PECVD growth process and a structure that includes a conductive substrate, a refractory template layer and a nucleation layer. Monolithic optical absorbers made according to the described structure and method exhibit high absorptivity, high site densities (greater than $10^9$ nanotubes/cm$^2$), very low reflectivity (below 1%), and high thermal stability in air (up to at least 400° C.). The PECVD process allows the application of such absorbers in a wide variety of end uses.

20 Claims, 18 Drawing Sheets

THERMALLY-RESILIENT, BROADBAND OPTICAL ABSORBER FROM UV-TO-IR DERIVED FROM CARBON NANOSTRUCTURES AND METHOD OF MAKING THE SAME

CROSS-REFERENCE TO RELATED APPLICATIONS

This application claims priority to and the benefit of U.S. provisional patent application Ser. No. 61/422,330 filed Dec. 13, 2010, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

FIELD OF THE INVENTION

The invention relates to optical absorbers in general and particularly to optical absorbers that employ carbon nanotubes.

BACKGROUND OF THE INVENTION

Novel properties often emerge in low-dimensional nanomaterials, such as polymer-nanorod organic solar cells, graphene, Si nanowires (NWs), and $TiO_2$ nanoparticles, which can be used to enhance the performance of devices for electronics, energy harvesting, photonics and sensing. Other examples show increased optical absorption efficiency arising from surface plasmon modes in 50-100 nm diameter spherical, metallic nanoparticles on amorphous Si which scatter light more effectively for solar cell applications.

Optical absorption efficiency, an important metric for sensing, radiometric and energy harvesting applications, has been studied theoretically and experimentally in porous, ordered nanostructures, including multi-walled- (MW) carbon nanotubes (CNTs) and single-walled- (SW) CNTs. High-density arrays of CNTs on electrically insulating and nonmetallic substrates have been commonly reported.

There is a need for systems and methods that provide optical absorbers that operate over a wide range of wavelengths and that have high absorptivity, low reflectivity and thermal stability.

SUMMARY OF THE INVENTION

According to one aspect, the invention features a monolithic optical absorber. The monolithic optical absorber comprises a conductive substrate having a surface; a template layer in contact with the surface of the conductive substrate, the template layer having a template layer surface; a nucleation layer in contact with the surface of the template layer, the nucleation layer having a nucleation layer surface; and a carbon nanotube array in contact with the nucleation layer surface, the carbon nanotube array having a plurality of mutually aligned nanotubes with a site density of at least $1\times10^9$ nanotubes/$cm^2$.

In one embodiment, the conductive substrate is a silicon wafer.

In another embodiment, the conductive substrate is a metal.

In yet another embodiment, the template layer comprises a refractory nitride.

In still another embodiment, the template layer comprises NbTiN.

In a further embodiment, the nucleation layer comprises Co and Ti.

In yet a further embodiment, the monolithic optical absorber has a reflectivity of less than 1%.

In still a further embodiment, the monolithic optical absorber absorbs radiation in the wavelength range of 350 nm to 7000 nm.

In another embodiment, the monolithic optical absorber absorbs radiation in the wavelength range of 350 nm to 200,000 nm.

According to another aspect, the invention relates to a method of manufacturing a monolithic optical absorber. The method comprises the steps of: providing a conductive substrate having a surface; depositing on the surface of the conductive substrate a template layer having a template layer surface; depositing on the surface of the template layer a nucleation layer having a nucleation layer surface; and using a plasma deposition method, growing a plurality of mutually aligned carbon nanotubes on the surface of the nucleation layer.

In one embodiment, the plasma deposition method is a plasma-assisted chemical vapor deposition method.

In another embodiment, the plasma deposition method includes the use of an electric field.

In yet another embodiment, an orientation of a length of the carbon nanotube array having a plurality of mutually aligned nanotubes relative to the surface of the conductive substrate is controlled by controlling an orientation of the electric field relative to the surface of the conductive substrate during the growing step.

In still another embodiment, the conductive substrate is a silicon wafer.

In a further embodiment, the conductive substrate is a metal.

In yet a further embodiment, the template layer comprises a refractory nitride.

In an additional embodiment, the template layer comprises NbTiN.

In one more embodiment, the nucleation layer comprises Co and Ti.

In still a further embodiment, a thickness of the nucleation layer is adjusted.

In yet another embodiment, the carbon nanotube array having a plurality of mutually aligned nanotubes has a site density in the range of $1\times10^9$ nanotubes/$cm^2$ to $1\times10^{12}$ nanotubes/$cm^2$.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
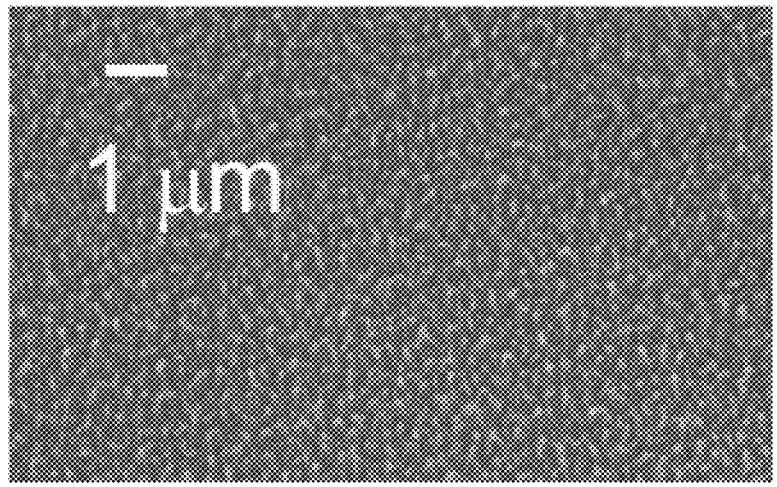
FIG. 1 is an SEM micrograph of a Co/Ti/Si sample after DC PECVD growth. All SEMs were taken at a 30° viewing angle.

We describe a nanomaterial-based monolithic optical absorber which offers exceptional light-trapping capabilities as a result of its unique physical structure comprised of high-density, porous arrays of thin (10-15 nm diameter), vertically oriented MWCNTs. This monolithic optical absorber provides an optical-to-thermal transduction mechanism that offers a broad spectrum of applications, ranging from energy harnessing, high sensitivity thermal detectors, radiative cooling, thermography, antireflection coatings and optical baffles to reduce scattering. In some embodiments, the monolithic optical absorbers can be used with thermo-electric converters, for example, thermo-electric converters situated on a roof-top where solar energy is trapped by the absorbers and the thermo-electric converts this thermal energy to electricity. The monolithic optical absorbers have been demonstrated to be unaffected by high temperatures up to at least 400° C., which allows their application in environments where elevated temperatures are expected.

We have fabricated vertically aligned MWCNT arrays with CNT site densities greater than $1 \times 10^{11}$ nanotubes/$cm^2$ synthesized directly on conductive substrates (e.g., doped semiconductor substrates or metallic substrates) using a plasma-enhanced (PE) chemical vapor deposition (CVD) process and have characterized the absorption efficiencies of the arrays in the 350 nm-7000 nm wavelength range, spanning the range from the ultraviolet (UV) to the infra-red (IR) for the first time. It is expected that this range can be much broader, for example from 350 nm into the far-IR range, up to 200,000 nm or 200 μm (microns). It is expected that applications of these absorbers will include broad-band detectors (both cooled or uncooled) that can operate into the far-IR range. It is believed that one can tune the absorption to longer wavelengths beyond 7000 nm by tuning the length of the CNTs (e.g., up to hundreds of microns) so the length is comparable to the wavelength of the incoming radiation. In practice, the length would be controlled by the growth time during PECVD synthesis. The LWIR, mid-IR and far-IR range are important windows for applications because there is a lack of suitable black coatings at these longer wavelengths.

In the past, using conventional thermal CVD deposition, achieving high site-densities on metals has been challenging, because site-densities on metals are reduced many-fold due to the challenges in stabilizing catalyst nanoparticles on metallic surfaces at high temperatures. Our ultra-thin absorbers exhibit a reflectance as low as ~0.02% (100 times lower than the benchmark) which has the potential to increase sensitivity and speed of thermal detectors in focal plane arrays. The present results increase the portfolio of materials that can be integrated with such absorbers due to the potential for reduced synthesis temperatures arising from a plasma process. A phenomenological model enabled us to determine the extinction coefficients in these nanostructures and we have also demonstrated their remarkable immunity to high temperatures, which is advantageous for solar-cell applications.

It is believed that the orientation of the CNTs relative to the surface of the conductive substrate is defined by the relative orientation of the applied electric field and the surface of the conductive substrate as the growth of the CNTs proceeds. Therefore, it is believed that CNTs (and CNT arrays) having controlled orientation along the length of the CNTs can be fabricated by controlling the relative orientation of the applied electric field and the surface of the conductive substrate. For example, it is expected that CNTs and CNT arrays having deliberately introduced "bends" or changes in orientation along the length of the CNTs can be fabricated by changing the relative orientation of the applied electric field and the surface of the conductive substrate during the growth process.

Previously synthesized MWCNTs and SWCNTs for optical absorber applications used water-assisted thermal CVD, which yields exceptionally high growth rates with CNT lengths greater than hundreds of microns, where alignment is believed to occur primarily via the crowding effect. While thermal CVD is generally considered ineffective in aligning short CNTs (CNTs having length <10 μm), we have demonstrated that growth of nanotubes using a glow discharge (PECVD) growth method produces vertically aligned CNTs with lengths more than an order of magnitude shorter, which nonetheless still yield broadband, high-efficiency optical absorption characteristics in the UV-to-IR range. This work also extends the previously reported measurements on MWCNTs that were conducted in the visible, to well into the IR regime where it is increasingly difficult to find suitable black/opaque coatings. A thin and yet highly absorbing coating with absorptance A is valuable for thermal detector applications in the IR for radiometry in order to enhance sensitivity, since the detectivity $D^* \propto A$. Besides sensitivity, a thinner absorber yields high detector speeds since the thermal response time $$\tau_{th} = \frac{C_{th}}{G},$$

where $C_{th}$ is the heat capacity (J/K) of the absorber, G is the thermal conductance (W/K) and $C_{th} \propto a*l$ where a and l are the area and thickness of the absorber; thus a greater than 10 times reduction in l increases the detector speed by greater than 10 times.

The other structural trait for enhancing optical absorption efficiency is a high site density, e.g., a high density of nanotubes per unit area. Unlike earlier reports where the CNTs were synthesized directly on Si or $SiO_2$ we have demonstrated growth of high-efficiency MWCNT absorbers directly on metallic substrates with site densities as high as $\sim 4 \times 10^{11}$ nanotubes/$cm^2$. In many other applications, it is desirable to grow CNTs directly on metals for lowering contact resistance but the challenges in stabilizing catalyst particles on metallic surfaces at high temperatures have generally reduced site densities of CNTs many fold (up to 100×). In addition, prior attempts at growing MWCNTs for optical absorber applications on substrates other than Si, such as $LiNbO_3$ yielded an absorption efficiency of ~85% from λ~600 nm to λ~1800 nm, whereas the CNT absorbers synthesized here on metallic substrates are shown to have an absorption efficiency greater than 99.98% from λ~350 nm to λ~2500 nm. Even cermet-based materials, currently used for solar selective coatings on metallic substrates such as Cu and Al, have absorption efficiencies that are several orders of magnitude (up to $10^4$ times) lower than that reported here. We also have demonstrated for the first time that the MWCNT absorbers are exceptionally rugged and exhibit a negligible change in absorption when exposed to temperatures as high as 400° C. in an oxidizing environment, in contrast to the benchmark Au-black, a commonly used black-body reference material, which degrades under the same thermal treatment. Additionally, a plasma-based process increases the potential of forming these absorbers at lower synthesis temperatures compared to thermal CVD, increasing future prospects of integrating such absorbers with a wider range of materials such as low-cost, flexible substrates for solar-cells, solar thermal collectors, or with thermoelectrics, as well as integrated with fragile, temperature-sensitive micro-machined structures used for IR sensing.

Figure 2:
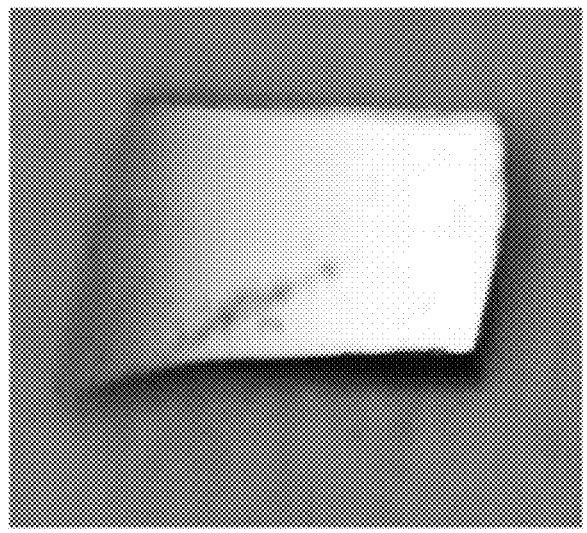
FIG. 2 is an optical image of the sample of FIG. 1 showing a reflective surface.
Figure 3:
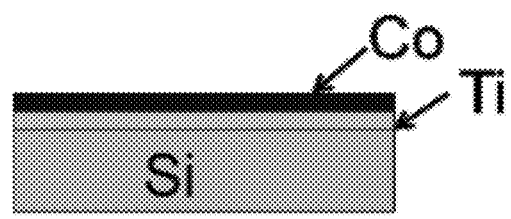
FIG. 3 is a diagram illustrating a vertical cross-section through the through the structure on which the sample of FIG. 1 was grown.

The choice of the template for PECVD synthesis of our MWCNTs was important in synthesizing a high-density array of CNTs. We have observed that the template can directly impact the optical absorption characteristics. For example, the scanning-electron-microscope (SEM) image in FIG. 1 shows amorphous carbon deposits when Co/Ti was placed directly on Si at 750° C., exhibiting a largely reflective surface (FIG. 2). On the other hand, using a Co/Ti/NbTiN template yielded a visually black sample to the naked eye (FIG. 5), and the SEM image (FIG. 4) depicts a high-density array of MWCNTs which traps incoming light and suppresses reflection.

Figure 4:
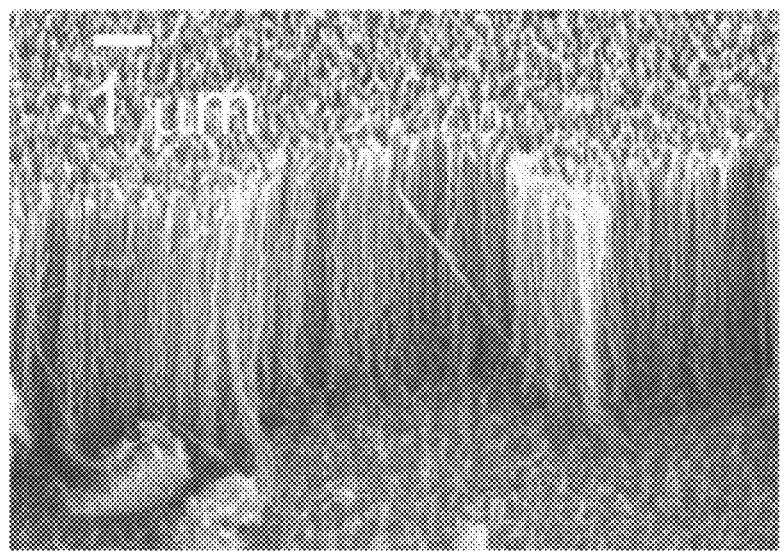
FIG. 4 is an SEM micrograph of a Co/Ti/NbTiN sample after growth, showing a high density carpet of MWCNTs.
Figure 5:
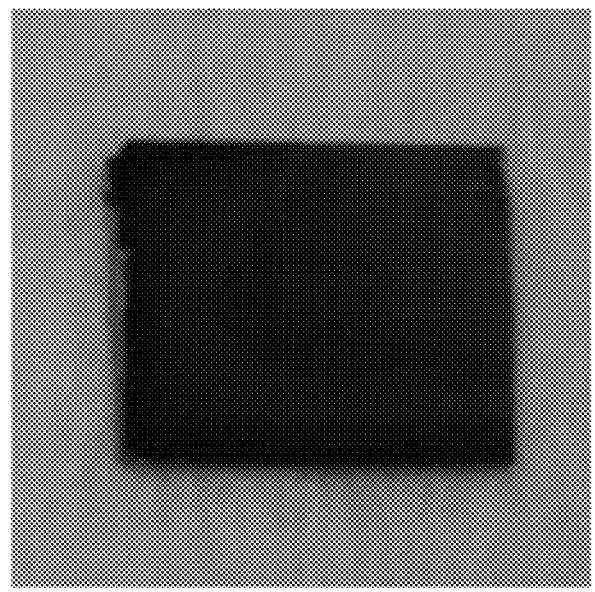
FIG. 5 is an optical image of the sample of FIG. 4 that appears as a visually black sample to the naked eye. The spatial uniformity of the MWCNT ensembles is high over large length scales.
Figure 6:
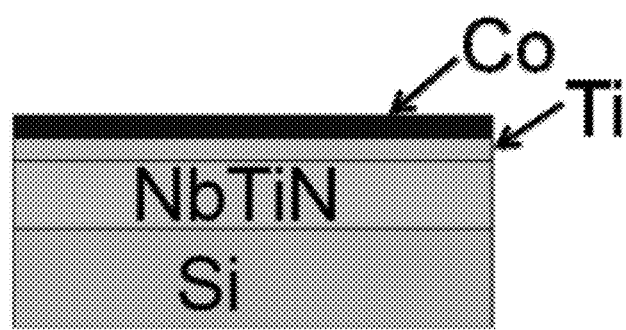
FIG. 6 is a diagram illustrating a vertical cross-section through the structure on which the sample of FIG. 4 was grown.
Figure 7:
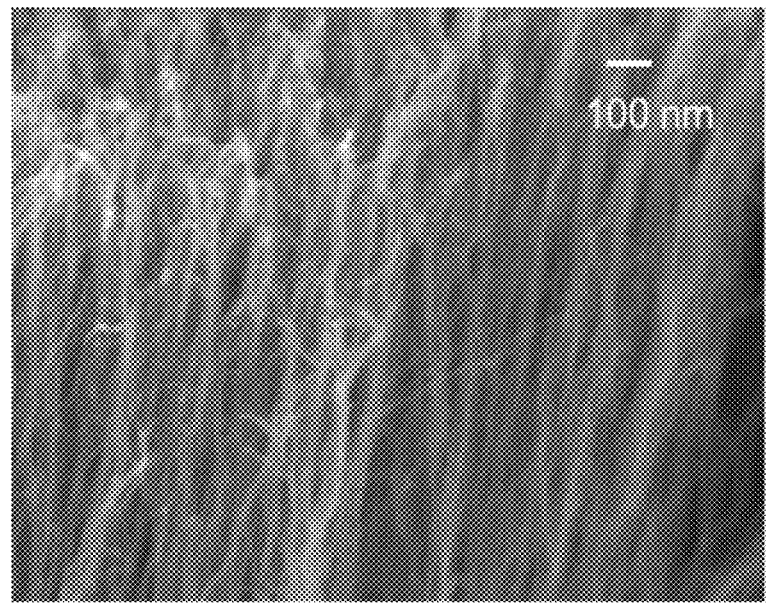
FIG. 7 is a high magnification SEM image that shows the porous, vertically aligned morphology of the CNT absorbers, in contrast to the reference benchmark Au-black absorber sample in FIG. 8.
Figure 8:
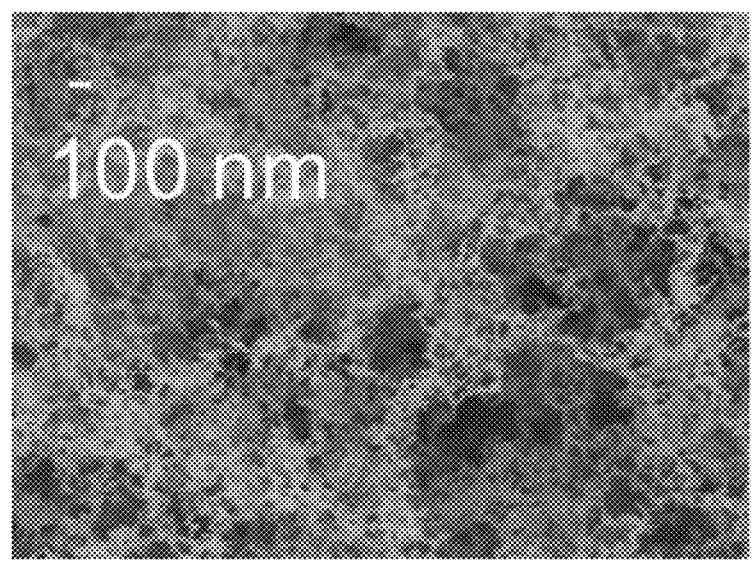
FIG. 8 is a high magnification SEM image that shows a percolated, randomly aligned network of fibers.

FIG. 6 is a diagram illustrating a vertical cross-section through the structure on which the sample of FIG. 4 was grown. As illustrated in FIG. 6, the structure includes a conductive substrate (the silicon wafer), a template layer (the NbTiN layer), and a nucleation layer or catalyst layer (the Ti/Co layers taken together), upon which the MWCNTs are grown to form a monolithic structure. The lack of growth of MWCNTs on Co/Ti/Si templates (FIG. 1) suggests that the presence of a refractory metallic nitride, such as NbTiN is important in stabilizing the catalyst nanoparticle to prevent diffusion and alloying of the catalyst with the underlying Si at high temperatures. In addition, the density of MWCNTs in the absence of the Ti layer on the Co/NbTiN templates was low. It is speculated that the Ti may enable the Co to fragment into nanoparticles, similar to the role of Mo in the Co—Mo bi-metallic catalyst system. The Ti—Co system also appears to incorporate a larger fraction of C compared to Co alone, enhancing CNT growth. Besides being of interest as absorbers in solar photo-thermal applications, the high areal density of MWCNTs on reflective, low resistivity (~110 μΩ-cm) metallic substrates may substantially reduce the CNT-to-substrate contact resistance. The high magnification image in FIG. 7 shows the surface of the MWCNTs arrays is rough, a factor which also contributes to scattering the incoming light diffusively. Shown in FIG. 8 is the SEM image of our benchmark, a Au-black absorber, which was synthesized using approaches similar to prior reports; the percolated, random network of such a diffuse metal-black should be apparent.

Figure 9:
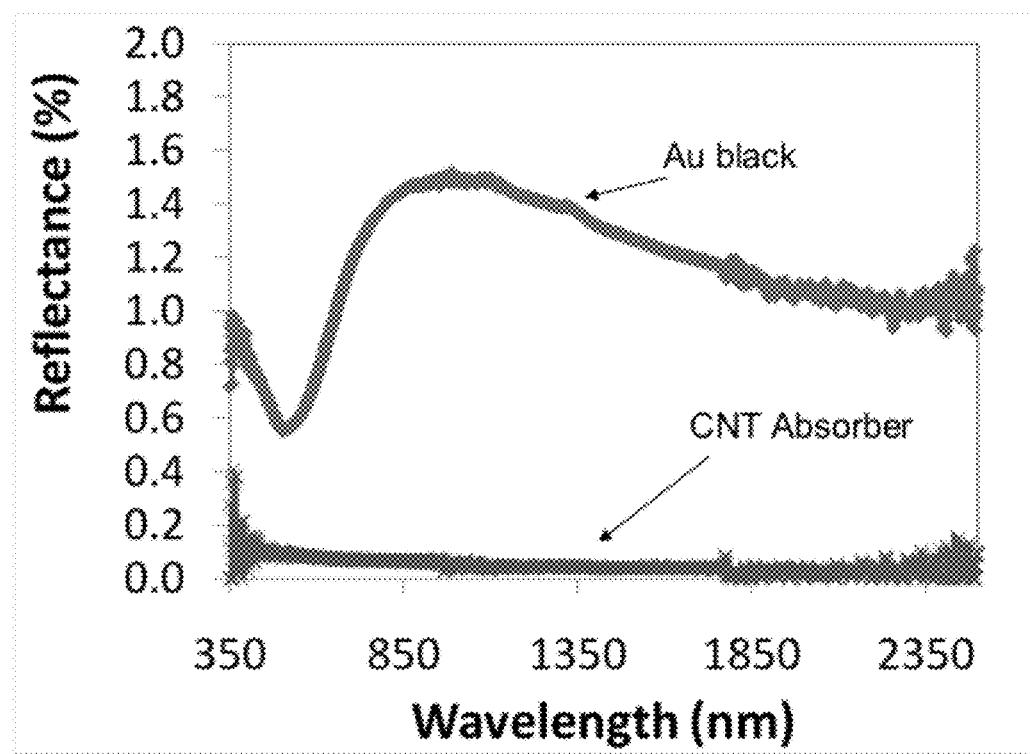
FIG. 9 is a graph illustrating the results of reflectance measurements from $\lambda \sim 350$ nm-2500 nm for the MWCNT absorber and a Au-black absorber reference sample. The Au-black reference sample has R~100× larger where R~0.02% for the CNT sample compared to 1.1% for the Au-black at $\lambda \sim 2000$ nm.

The optical reflectance response of the CNT absorber is shown in FIG. 9, where the spectrum is compared to that of a reference Au-black absorber. The reflectance R of the CNT absorber is nearly two orders of magnitude lower than that of the Au-black, e.g., ~0.02% at λ~2000 nm compared to 1.1% for Au-black. Other commonly used absorbers, such as NiP have higher R~0.5-1% for λ~320-2140 nm, while ultra-black NiP alloy has R~0.16-0.18% from λ~488-1500 nm, and black paint has R greater than 2.5% from λ~600-1600 nm. Top-down synthesized Si nanotips exhibit R~0.09% at λ~1000 nm, while bottom-up synthesized nanocone arrays have been reported to have an absorption efficiency of ~93% from λ~400-650 nm.

Figure 11:
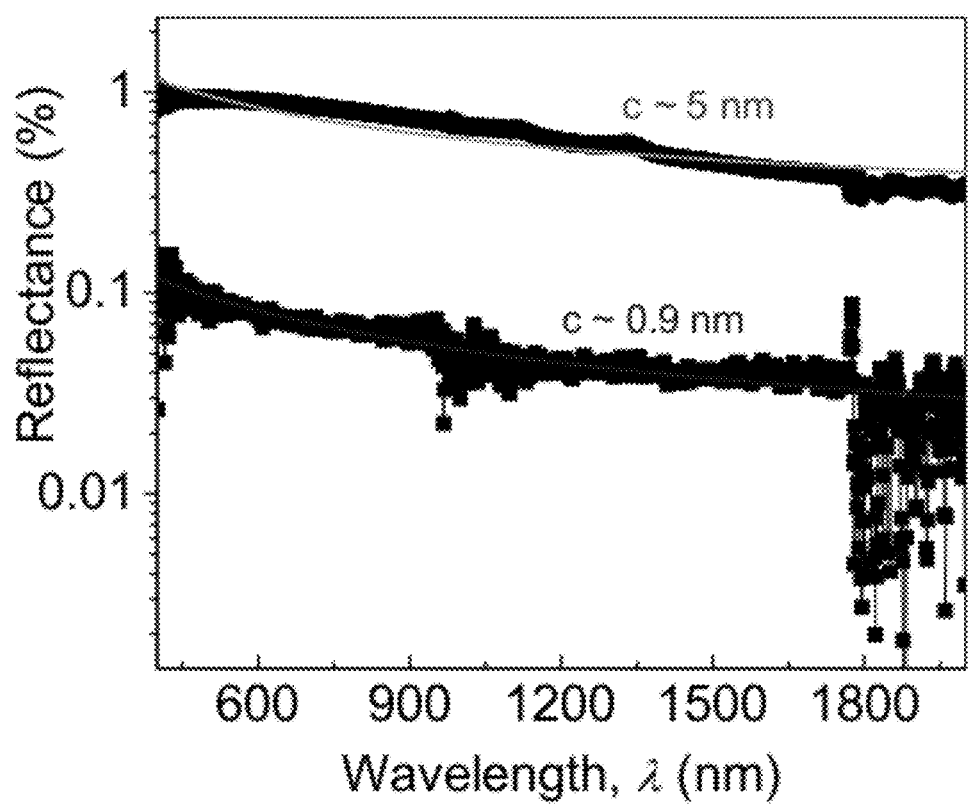
FIG. 11 is a graph showing optical reflectance spectra taken for two samples with Co catalyst thicknesses c~0.9 nm and 5 nm. Superimposed on the reflectance vs. wavelength data are theoretical fits from which the ratio of $\kappa$ at c~0.9 nm and 0.5 nm was determined.
Figure 12:
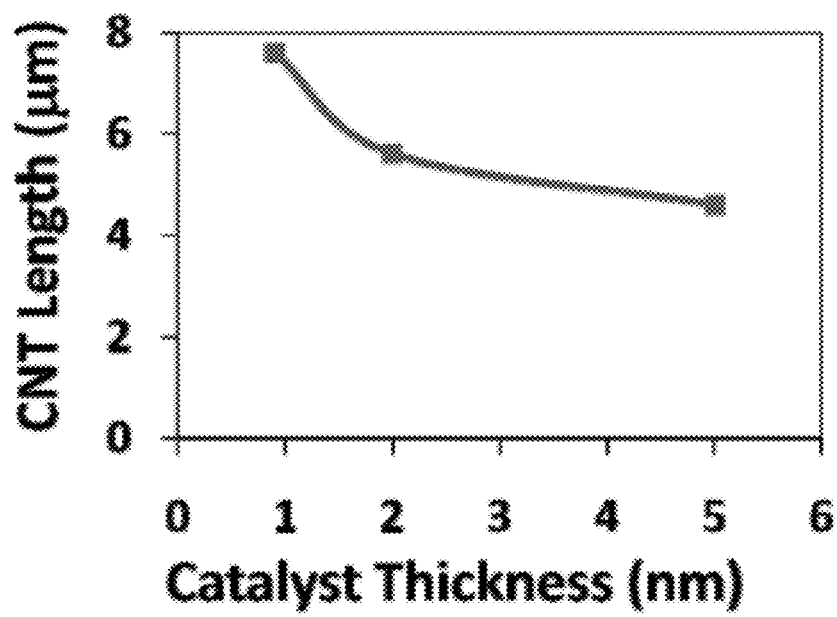
FIG. 12 shows the variation of the thickness l of the absorber with Co catalyst thickness c.
Figure 13:
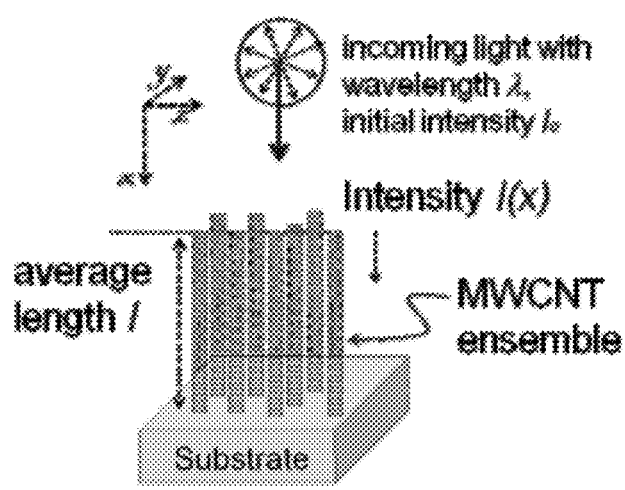
FIG. 13 is a diagram that illustrates the geometry used for the optical modeling analysis.
Figure 14:
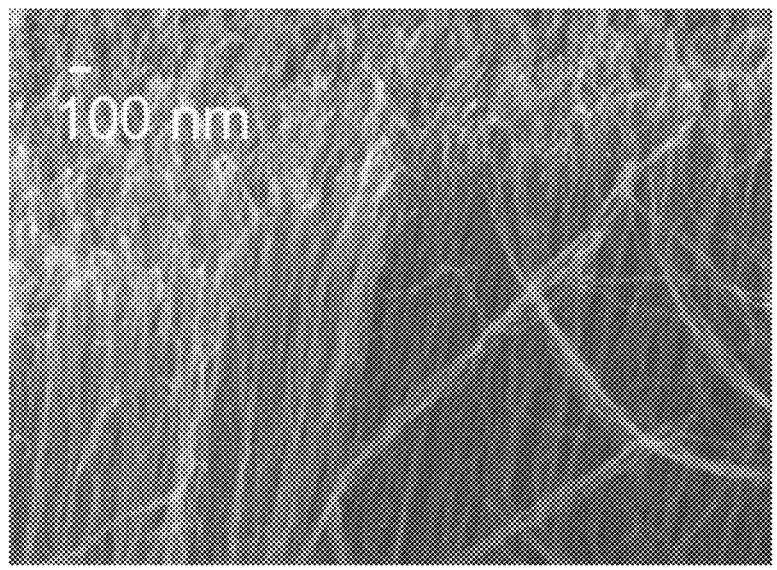
FIG. 14 illustrates the morphology of the MWCNTs for c~0.9 nm, showing thin, vertically aligned CNTs are depicted that have a high fill fraction with a site density of $\sim 4 \times 10^{11}/cm^2$ and MWCNT diameters ~10-15 nm. The growth conditions for the MWCNTs illustrated in FIG. 14, FIG. 15 and FIG. 16 were: 750° C., 172 W of plasma power, 30% $C_2H_2$, 5 Torr.
Figure 15:
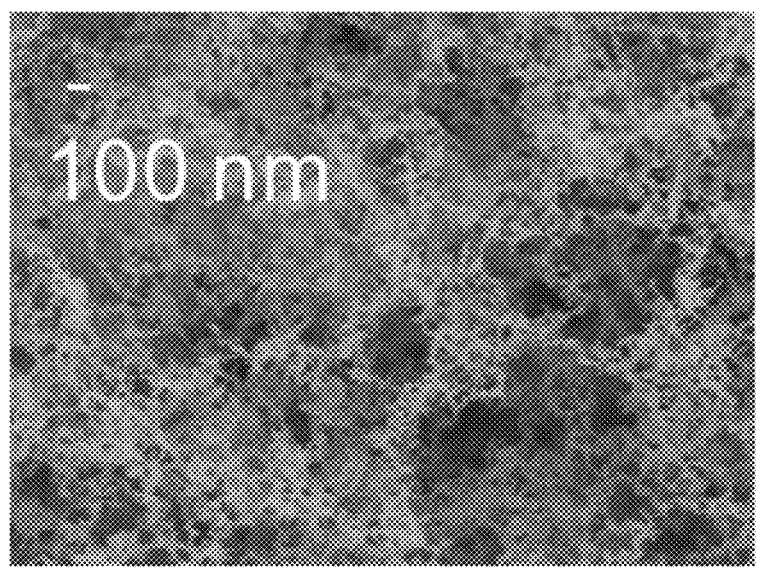
FIG. 15 illustrates the morphology of the MWCNTs for c~2 nm.
Figure 16:
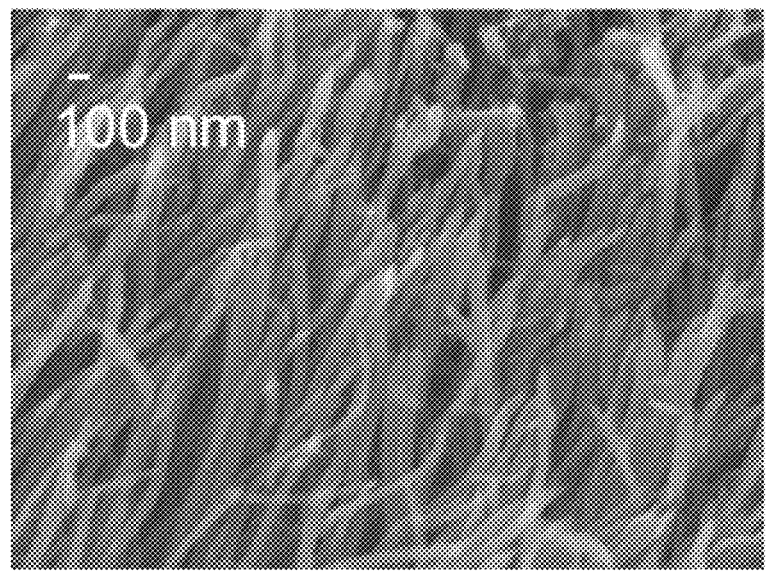
FIG. 16 illustrates the morphology of the MWCNTs for c~5 nm, showing a site density of $\sim 6 \times 10^9/cm^2$ with MWCNT diameters ~80-100 nm.

The catalyst thickness appears to be an important synthesis parameter that impacted the optical absorption efficiency in these carbon-based nanoabsorbers. Shown in FIG. 11 are reflectance spectra taken for two samples synthesized at Co catalyst thicknesses c~5 nm and 0.9 nm (with the Ti thickness fixed at 2.5 nm). The sample with c~0.9 nm has a wavelength independent response from λ~350 nm-2500 nm with R in the 0.02-0.03% range. The sample with c~5 nm, synthesized at identical conditions, has a wavelength dependent R which decreased from 0.94% at λ~400 nm to ~0.33% at λ~2000 nm. Tentatively, the decreased reflectance/increased absorption may be expressed through an exponential decrease of the transmitted intensity $I(x)$ following a simple Lambert-Beer law formulation, i.e., $I(x)=I_o \exp(-\alpha x)$, where $I_o$ is the initial intensity of the incoming light and α is the absorption coefficient. The schematic in FIG. 13 shows the geometry of the optical interrogation system, as the incoming light traverses through the sparse forest of CNTs with intensity $I(x)$ at any vertical location inside the CNT array. The typical absorption coefficient with $\alpha \sim 10^4$ cm$^{-1}$ for $I(x=8 \mu m)$ is approximately 30 times that for $I(x=4.5 \mu m)$. Now, the reflectance seems to decrease to the same order, i.e., on the average R drops from ~0.94 to ~0.03, approximately 30 times as well. The SEM images of the samples with c~0.9 nm and 5 nm are shown in FIG. 14, FIG. 15 and FIG. 16, respectively. This yielded a MWCNT site density of ~4×10$^{11}$ nanotubes/cm$^2$ with MWCNT diameters d~10-15 nm for c~0.9, and a site density of ~6×10$^9$ nanotubes/cm$^2$ with d~80-100 nm for c~5 nm. It is expected that site densities of carbon nanotubes in the range of 1×10$^9$ nanotubes/cm$^2$ to 1×10$^{12}$ nanotubes/cm$^2$ can be fabricated using the described methods. Although the length l of the MWCNTs decreased as c increased (FIG. 12), with c~5 nm, l was still >5 μm, well above λ in these measurements, suggesting that the reduced absorption from the thicker catalyst is likely a result of changes in the fill fraction. The ability to engineer optical absorption efficiency by controlling the catalyst thickness is an attractive feature in tuning the optical absorption properties of the MWCNT ensembles.

One mechanism by which porous objects suppress reflection is through a reduction in the effective refractive index n. However, porosity alone may not necessarily be the primary factor involved since the Au-black absorber samples, a largely porous structure (see SEM in FIG. 8) had higher reflectance compared to the MWCNT samples. This enhanced absorption may arise from the weak coupling of electrons in the vertically oriented CNTs to the incoming, normally-incident radiation, with minimal back-scattering and enables light to propagate into the long pores within the arrays until it is finally absorbed. A phenomenological model for absorption was developed using a formulation where the ensembles are treated as a composite medium consisting of nanostructures and air. The intensity at any given point x in FIG. 13 is given by $I(x)=I_o \exp(-\alpha x)$, where $$\alpha = \frac{4\pi \kappa}{\lambda}$$

and κ is the extinction coefficient. Assuming that there is no effective transmission through the substrate, $R(x) \sim (I_o - I(x))$. The corresponding variation of R with λ was then fit to the approximate expression $$a_1 e^{\frac{a_2}{\lambda}} + a_3$$

where $a_1$ is related to the incident intensity $I_o$, $a_2$ is a measure of the optical absorption length ($=\kappa l$) and $a_3$ is a constant. The fit to the data is shown in FIG. 11 for c~0.9 nm and 5 nm. From the fits, the value of $a_2$ was determined to be ~0.025 and ~0.026 for c~0.9 nm and 5 nm, respectively, and given that the ratio, $$\frac{(a_2)_{0.9}}{(a_2)_5} = \frac{(\kappa \cdot l)_{0.9}}{(\kappa \cdot l)_5}$$

and that l is 8 μm and 5 μm, respectively, we obtain a ratio of the extinction coefficients, $$\frac{\kappa_{0.9}}{\kappa_5} \text{ of } \sim 0.6.$$

We rationalize such a value by appealing to the relationship of the complex refractive index, $\tilde{N}(=n+i\kappa)$ to the dielectric constant, $\sqrt{\tilde{\in}}$ (where, $\tilde{\in} = \in_1 + \in_2$). It can then be derived that when absorption dominates, κ is proportional to $\sqrt{\tilde{\in}}$. Using a simple rule of mixtures, the dielectric constant of the air-CNT mixture, $\tilde{\in} = \alpha \cdot \in_{CNT} + \beta \cdot \in_{air}$, where α and β are the fractions of the CNT and air, respectively, i.e., $\alpha + \beta = 1$). For the observed MWCNT site density of ~4×10$^{11}$/cm$^2$ for c~0.9 nm, an average area per MWCNT is determined to be approximately 250 nm$^2$. Now, with an average d~10 nm, the area fraction α is approximately 0.31, where it is assumed that all the MWCNTs are perpendicular to the incident radiation. For the samples with c~5 nm, site density ~6×10$^9$/cm$^2$ and average d~100 nm, the corresponding average area per MWCNT is ~0.16×10$^4$ nm$^2$, and α is ~0.47. We use an average dielectric constant, $\tilde{\in}$ of ~23 for the CNTs over λ=350-3100 nm, extrapolated from the values of the complex refractive index of graphite at $\lambda \sim 350$ nm and 3100 nm, respectively. Since $\kappa \sim \sqrt{\in}$ we compute the ratio $$\frac{\kappa_{0.9}}{\kappa_5} \sim \sqrt{\left(\frac{(0.31 \cdot 23) + (0.69 \cdot 1)}{(0.47 \cdot 23) + (0.53 \cdot 1)}\right)} \sim 0.8.$$

The value of the $$\frac{\kappa_{0.9}}{\kappa_5}$$

ratio is then found to be quite close to the value obtained by the fitting shown in FIG. 11.

It is interesting that the extinction ratio is smaller for the MWCNTs grown with $c \sim 0.9$ nm compared to the CNTs grown with $c \sim 5$ nm. This observation can be rationalized on the basis of a smaller area fraction in the former case, i.e., 0.31 vs. 0.47. While such a rationalization does not explicitly consider the volume absorption due to a larger l in the former case (i.e., 8 µm vs. 5 µm), it is justified since it has previously been shown that for the case of absorption in Si nanowires the absorption in a thin film over a wide energy range comparable to the one used here, is on the average equivalent to the absorption in the nanowires. The larger absolute magnitude of R for the sample with $c \sim 5$ nm compared to the sample with $c \sim 0.9$ nm may indicate an influence of the substrate in the latter, the effect of which is more pronounced due to a shorter l for $c \sim 5$ nm.

Figure 17:
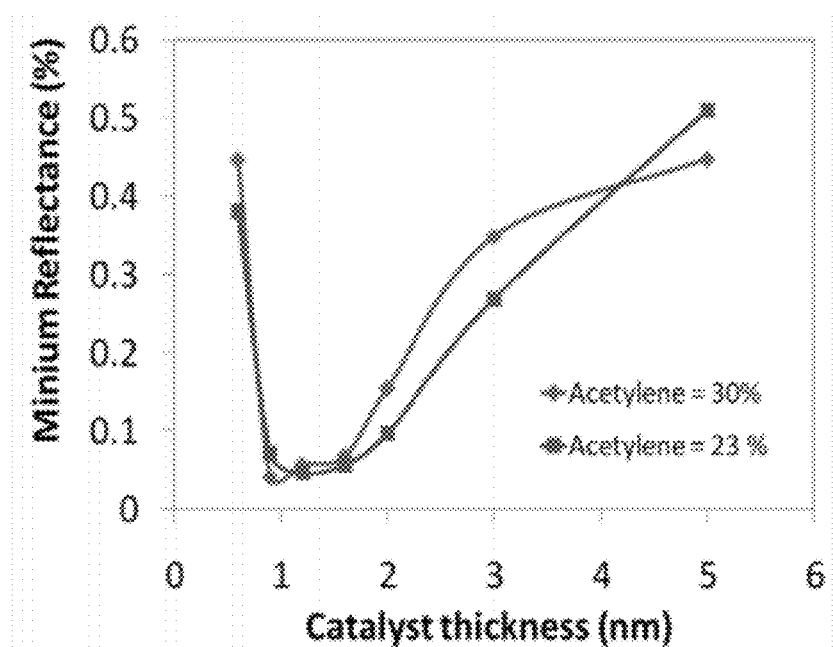
FIG. 17 is a graph showing the results of reflectance measurements as a function of c (taken at $\lambda \sim 1500$ nm) for two acetylene gas ratios (30% and 23%).

A more detailed analysis of the impact of catalyst thickness on the optical reflectance properties of the MWCNT absorbers was conducted for a wide range of catalyst thicknesses (FIG. 17). This data (at $\lambda \sim 1500$ nm) shows a minimum in the reflectance R at $c \sim 1$ nm. However, it is thought that R increases when $c \sim 0.6$ nm due to the inability to nucleate a high enough areal density of MWCNTs; such behavior was consistent for two different acetylene gas concentrations, as indicated.

Figure 18:
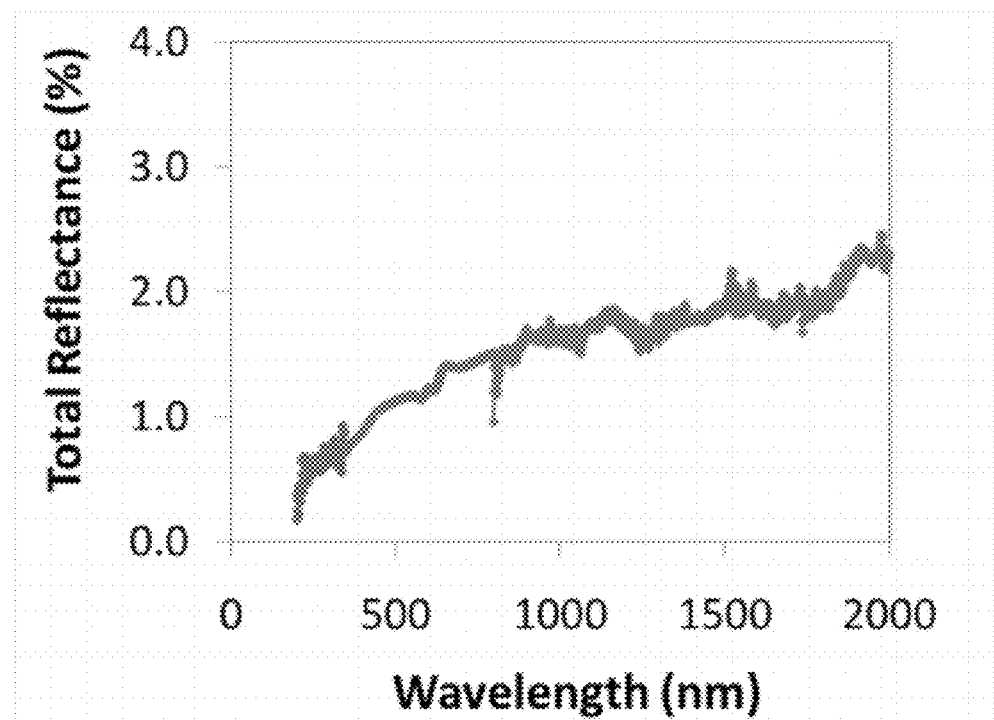
FIG. 18 is a graph that shows the results of total hemispherical reflectance measurements made from $\lambda \sim 250$ nm-2000 nm. The measurements reveal $R_T \sim 1.8\%$ at 1000 nm.
Figure 20:
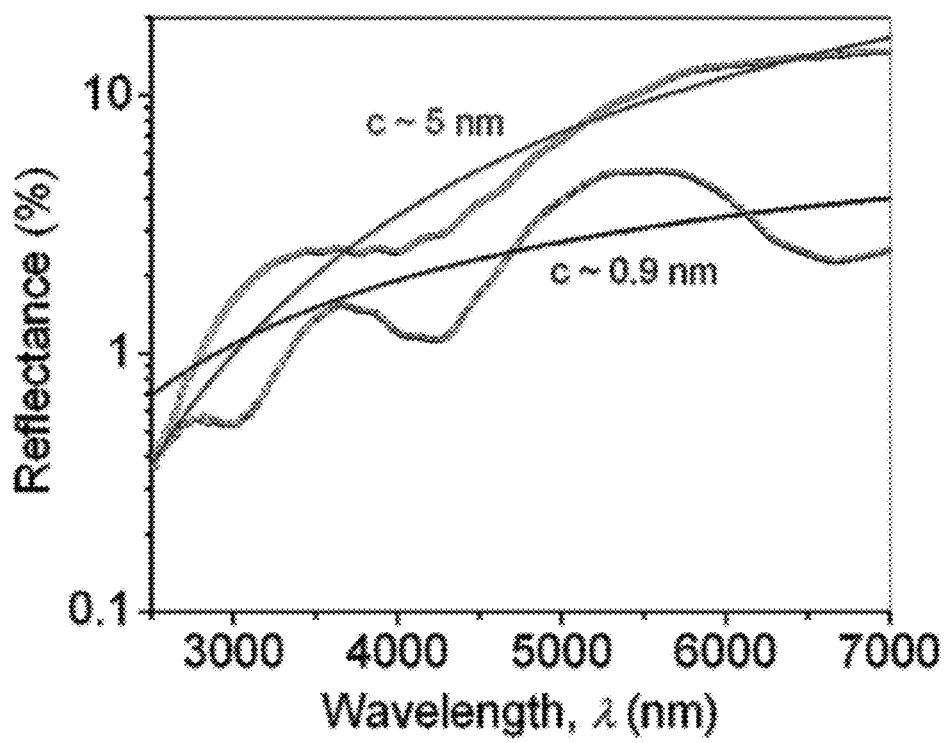
FIG. 20 illustrates the results of long-wavelength IR measurements, which yields reflectance R~2.4% for the sample with c~0.9 nm, while R~14.7% for c~5 nm at $\lambda \sim 7000$ nm. Superimposed are theoretical fits to the data for c~0.9 nm and 5 nm, using an expression of the form $R(\lambda) = R_o \exp(-\alpha/\lambda)$ where $\alpha$ is the absorption coefficient. The undulations in the reflectance are possibly due to interference effects from the substrate. The growth conditions were 750° C., 170 W of plasma power, 30% $C_2H_2$, and 5 Torr.
Figure 21:
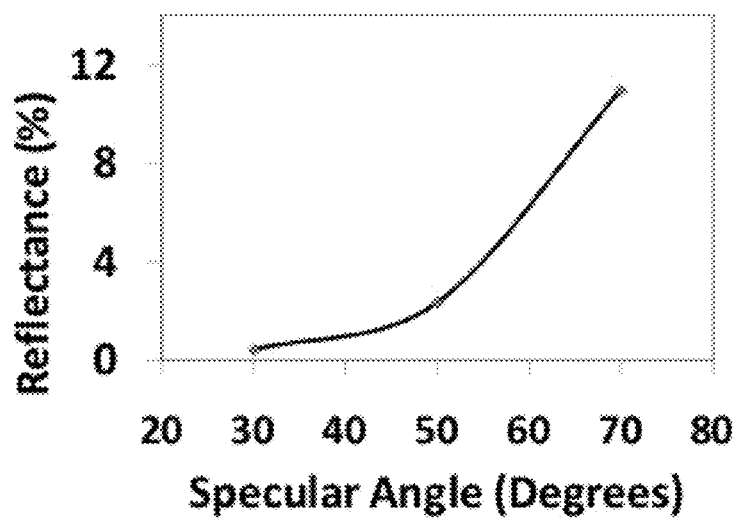
FIG. 21 is a graph that shows the angular dependence of reflectance R where R is fairly low (less than ~2%) up to 50°, and an increase up to ~10% is seen at 70°.

The data for the total reflectance $R_T$ of the CNT samples indicates an $R_T \sim 1.8\%$ at $\lambda \sim 1000$ nm as shown in FIG. 18. These measurements were obtained using an integrating sphere as shown schematically in FIG. 19. This is more than four times lower than top-down synthesized Si nanotips with an $R_T \sim 8\%$ at $\lambda \sim 1000$ nm. In addition, $R_T$ of our samples is 0.8% at $\lambda \sim 400$ nm, in contrast to Si nanostructured films which have $R_T \sim 1.46\%$ in the range of $\lambda \sim 300$-600 nm. Optical reflectance measurements on the CNT absorbers were also extended to the longer IR wavelengths, where it is increasingly difficult to find highly efficient optically black coatings. FIG. 20 shows the specular reflectance, measured using a Harrick 30° specular reflectance attachment, for samples with $c \sim 0.9$ nm and 1.6 nm. Again, the specular reflectance for samples with the thinner catalyst $c \sim 0.9$ nm was much lower ($\sim 2.4\%$) than CNTs grown with $c \sim 1.6$ nm ($\sim 14.7\%$) at $\lambda \sim 7000$ nm, and confirms the highly absorbing characteristic of these absorbers at long IR wavelengths. The angular dependence of the specular reflectance was also measured in the range of 30° to 70°, as shown in FIG. 21 (taken at $\lambda \sim 2500$ nm). Although the intensity of the specular reflectance increases with incident angle, the change is relatively small. In comparison, other anti-reflection thin film coatings suppress reflection over a narrow band of angles and have selective absorption characteristics over a narrow spectral range.

Figure 22:
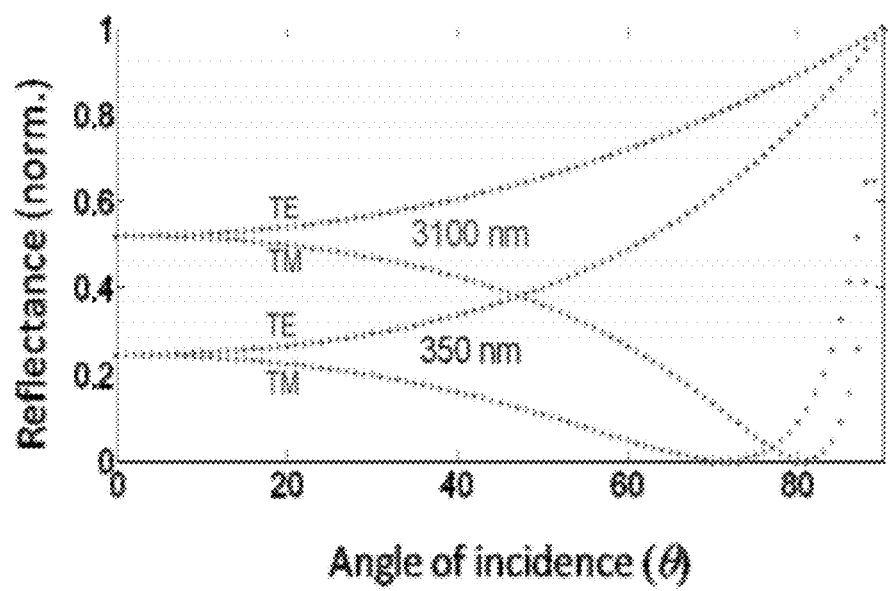
FIG. 22 is a graph that shows the variation of R with specular angle of incidence, assuming TE and TM polarized-modes of radiation. While a polarization-sensitive study can yield additional insights, an absolute minimum in the TM mode at 72° can be used to further suppress R to enhance absorption.

Modeling analysis was also pursued at longer wavelengths (>2500 nm) where the increase in R was fit to an expression of the form, $R(\lambda) = R_o \exp(-\alpha/\lambda)$ and the fits to the data are shown in FIG. 20. It was found from the fits that the value of $\alpha$ for $c \sim 0.9$ nm and 5 nm was $\sim 12560$ nm and $\sim 6850$ nm, respectively. From the ratio $$\frac{(\alpha)_{0.9}}{(\alpha)_5} = \frac{(\kappa \cdot l)_{0.9}}{(\kappa \cdot l)_5}$$

we deduce a $$\frac{\kappa_{0.9}}{\kappa_5}$$

value of $\sim 0.4$, which is again close to the previously determined ratio. The angular dependence of R can be modeled by assuming that the incident radiation is predominantly Transverse Electric (TE) polarized. Experimentally, it is possible that the beam is more polarized in one mode than the other but more thorough measurements would need to be conducted to quantify this more accurately. It was seen from FIG. 22, that R increases with angle, as seen for the TE polarization and also that the absolute magnitude of R increases with $\lambda$, confirming experimental observations. It is expected that polarization-sensitive measurements will be undertaken, for example with the Transverse Magnetic (TM) optical mode as well, where the E-field is along the axis of the CNTs, where greater absorption is expected. This would yield a minimum in R at a specific angle, for example at $\sim 72°$ with $\lambda = 350$ nm as shown in FIG. 22, which may be used in further reducing the reflectance.

Figure 23:
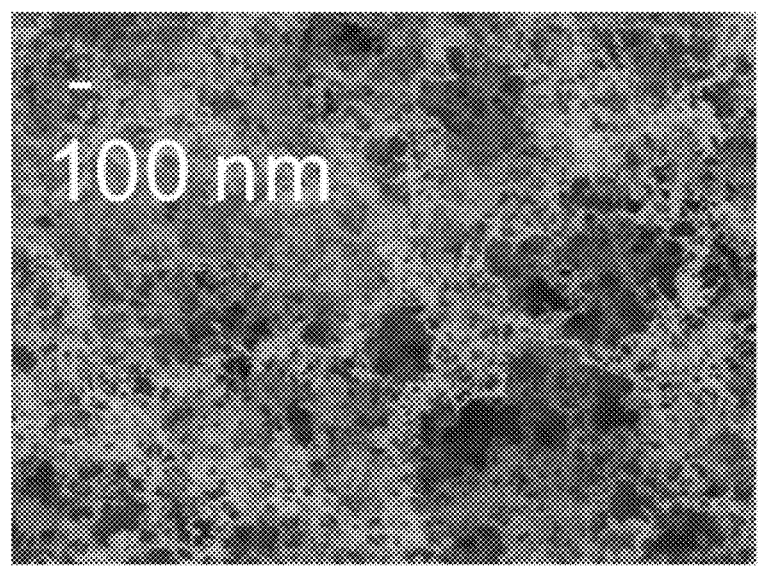
FIG. 23 is an SEM image of an Au-black absorber sample at 25° C.
Figure 24:
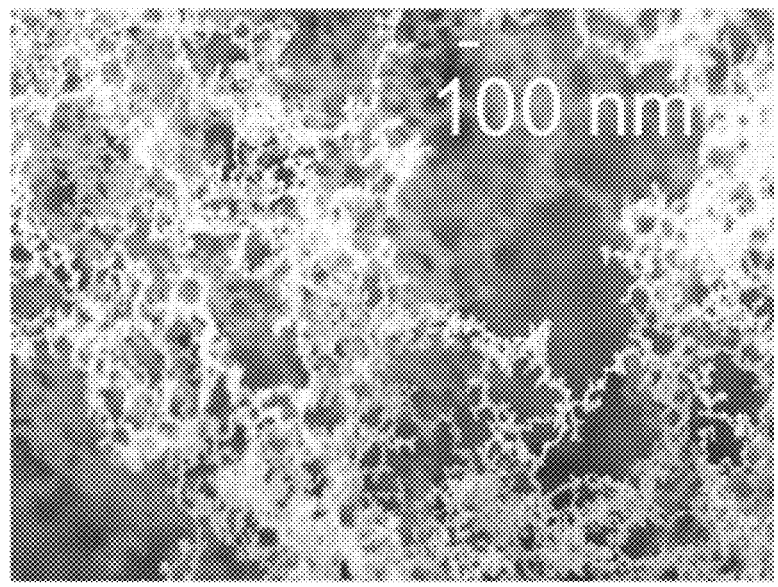
FIG. 24 is an SEM image of the Au-black absorber after heating to 200° C. for 1 hour in air. After heating to 200° C., the percolated structure of the Au-black absorber sample appears to fragment.
Figure 25:
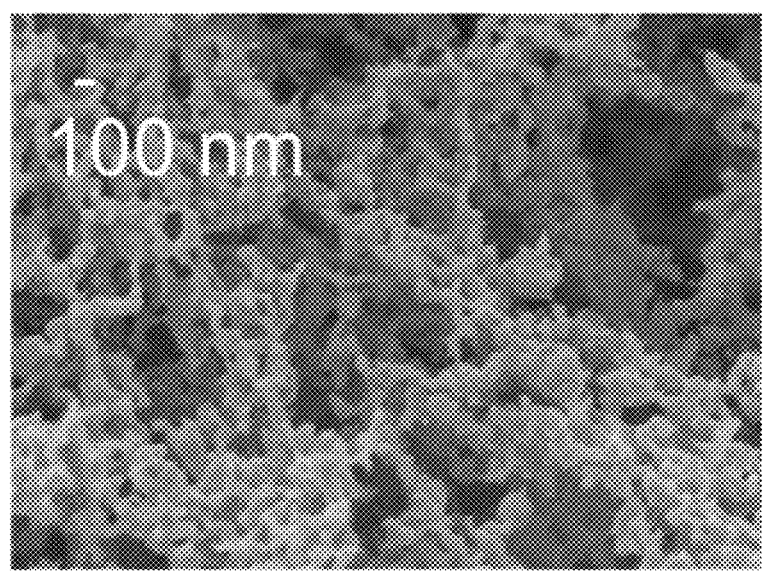
FIG. 25 is an SEM image of the Au-black absorber after heating to 400° C. for 1 hour in air. After heating to 400° C. the structure collapses completely as the filaments coarsen.
Figure 26:
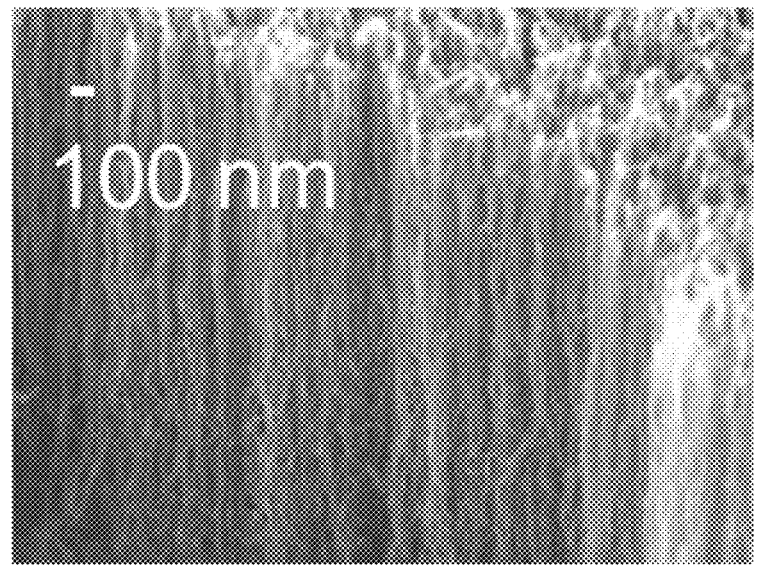
FIG. 26 is an SEM image of a MWCNT absorber sample at 25° C.
Figure 27:
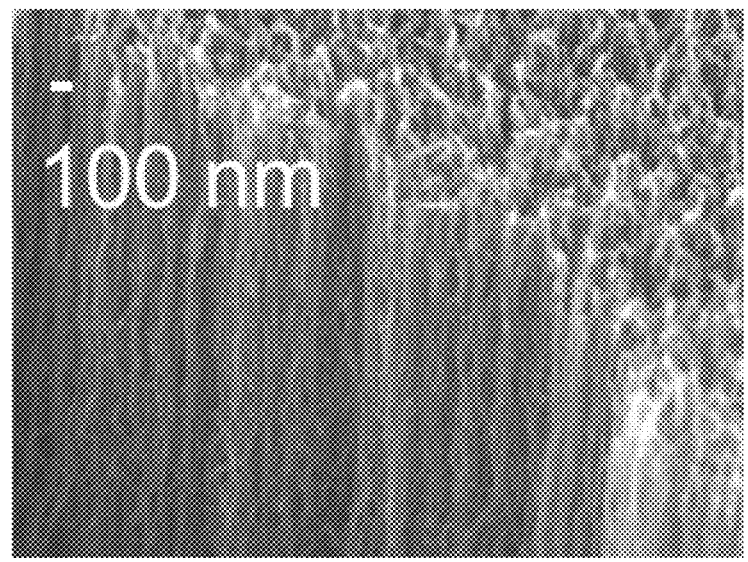
FIG. 27 is an SEM image of the MWCNT absorber sample after heating to 200° C.
Figure 28:
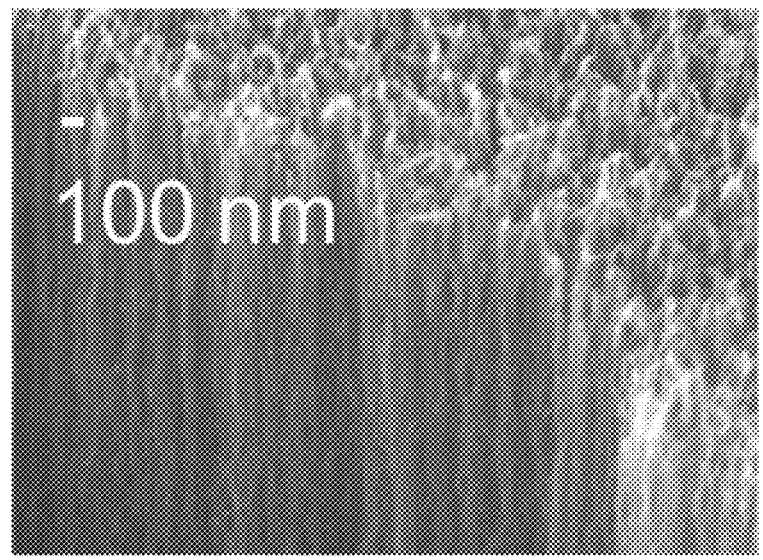
FIG. 28 is an SEM image of the MWCNT absorber sample after heating to 400° C. The MWCNT absorbers have a high structural integrity since no change in morphology is detected after heating to 200° C. and 400° C.
Figure 29:
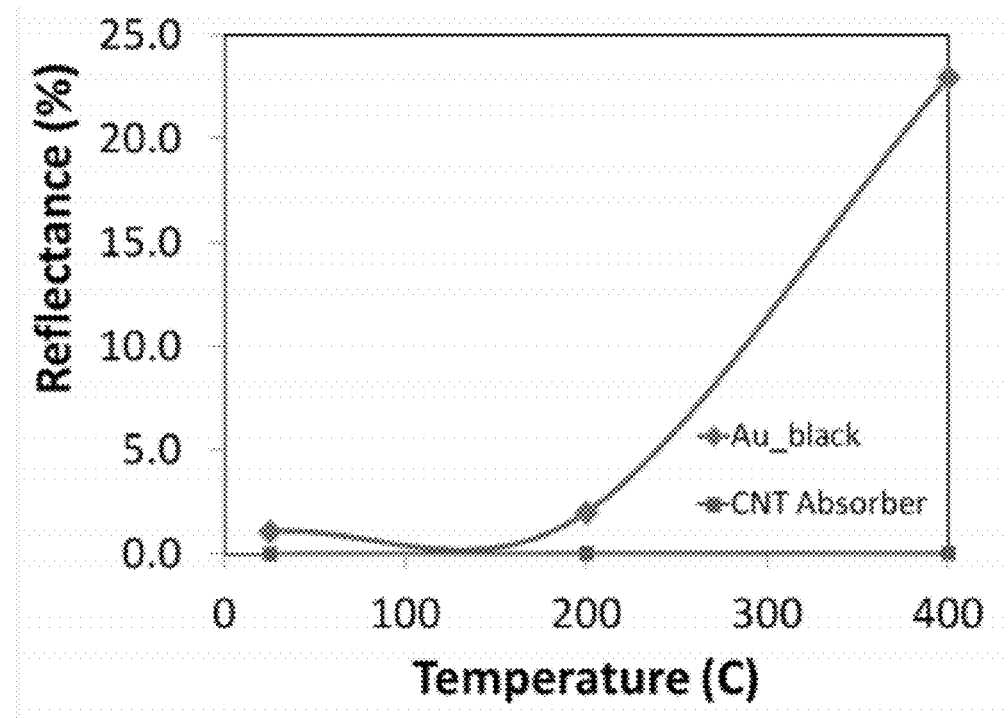
FIG. 29 is a graph showing the results of reflectance measurements of the Au-black and CNT absorber samples as a function of temperature. The Au-black absorber shows R increasing up to 23% after heating to 400° C., while the CNT absorber shows essentially R=0 versus temperature using the same vertical axis.
Figure 30:
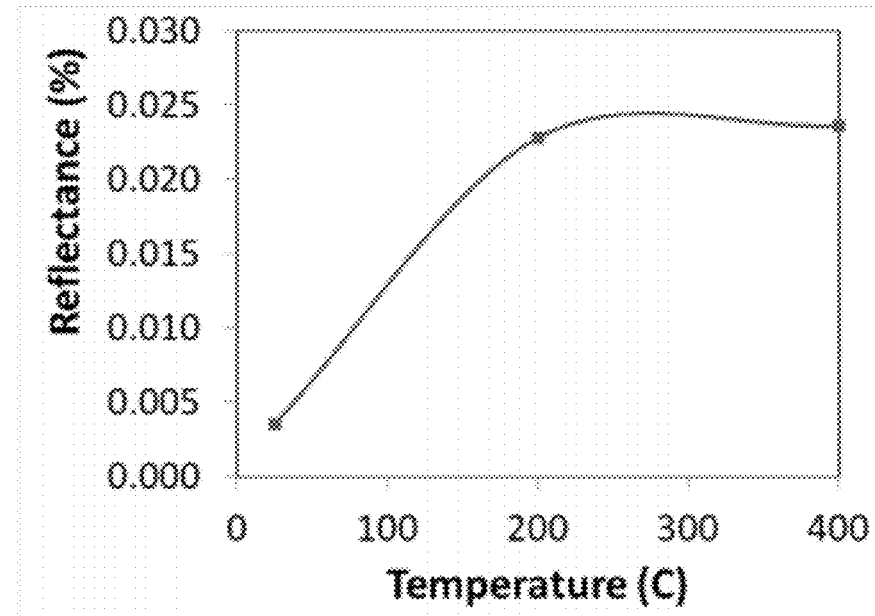
FIG. 30 is a graph showing the results of reflectance R measurements of the CNT sample versus temperature using a higher resolution on the vertical axis. R increases slightly after exposure to 200° C. but it is still very low (R~0.022% at $\lambda \sim 2000$ nm) and remains unchanged after exposure to temperatures as high as ~400° C.

We now present data which demonstrates the exceptionally low R of the MWCNT absorbers even after they were exposed to temperatures as high as 400° C. in air under an oxidizing environment, as might be expected with incident solar radiation, for example in a concentrator geometry application. In comparison, the structural characteristics of the Au-black absorber reference gradually deteriorate with increasing temperature as indicated through the SEM images of FIG. 23 through FIG. 25. However, the structural characteristics of the MWCNT absorber samples are largely unchanged when heated from 25° C. (FIG. 26), to 200° C. (FIG. 27) and to 400° C. (FIG. 28). From the corresponding optical spectra (FIG. 29) it is apparent that R of the Au-black absorber sample increases as it is heated from 25° C. to 200° C. (2%) and is $\sim 23\%$ at 400° C. (at $\lambda \sim 2000$ nm). On the other hand, the R of the CNT absorbers is still very low, $\sim 0.022\%$ after heating to 200° C. (FIG. 30), and remains unchanged after exposure to temperatures as high as 400° C. which can be correlated to the structural integrity of the CNT absorbers to temperatures as high as 400° C. (FIG. 28).

In conclusion, we have successfully shown that, through catalyst engineering, PECVD synthesized MWCNTs yield a high site-density on metallic substrates which exhibit ultra-low reflectance ($\sim 0.02\%$) over a wide spectral range from UV-to-IR for relatively thin (less than 10 µm) absorber ensembles. Their highly-efficient optical absorption properties and exceptional ruggedness at high temperatures suggests their promise in solar photo-thermal applications and IR thermal detectors for radiometry applications. In addition, the use of a plasma-based process increases the potential for synthesizing the absorbers at lower temperatures in the future, increasing the likelihood of integrating the absorbers with low-cost flexible substrates, potentially for solar-cell applications, as well as thermoelectrics and micro-machined structures for enabling new classes of IR sensors, particularly for rugged environments.

Synthesis of Nanostructures

The initial substrate for the synthesis of the MWCNTs was a <100> oriented Si wafer on which a layer of 100-200 nm thick refractory, high temperature conducting nitride (Nb-TiN) was deposited reactively in a $N_2$ and Ar ambient using DC magnetron sputtering at a power of ~220 W and 5 mTorr. Bi-metallic layers of Co (thickness range 0.6 nm-6 nm) and 2.5 nm thick Ti were e-beam evaporated and served as the catalyst. Beside the Co/Ti/NbTiN/Si templates, control samples of Co/Ti/Si, Co/NbTiN/Si and Co/Si were also prepared. Multiple samples (area ~4 $cm^2$) were placed on a wafer during PECVD growth so that comparative analysis could be performed for different combinations of templates under similar synthesis conditions. At temperatures in the range of 550 to 750° C., $H_2$ was flowed into the chamber for several minutes, and the growth gases acetylene ($C_2H_2$) and ammonia ($NH_3$) were then introduced to a typical pressure of ~5 Torr and the discharge was then ignited.

Figure 32:
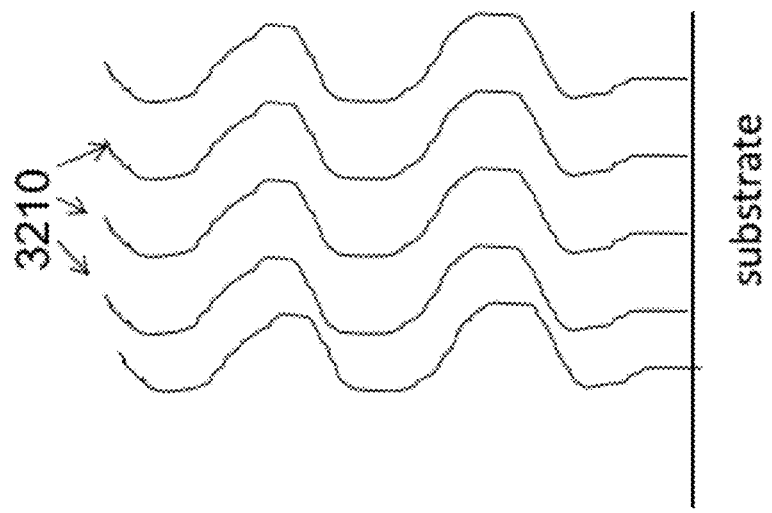
FIG. 32 is a schematic diagram that illustrates the alignment of a plurality of CNTs that are grown using an electric field that is varied continuously.
Figure 31:
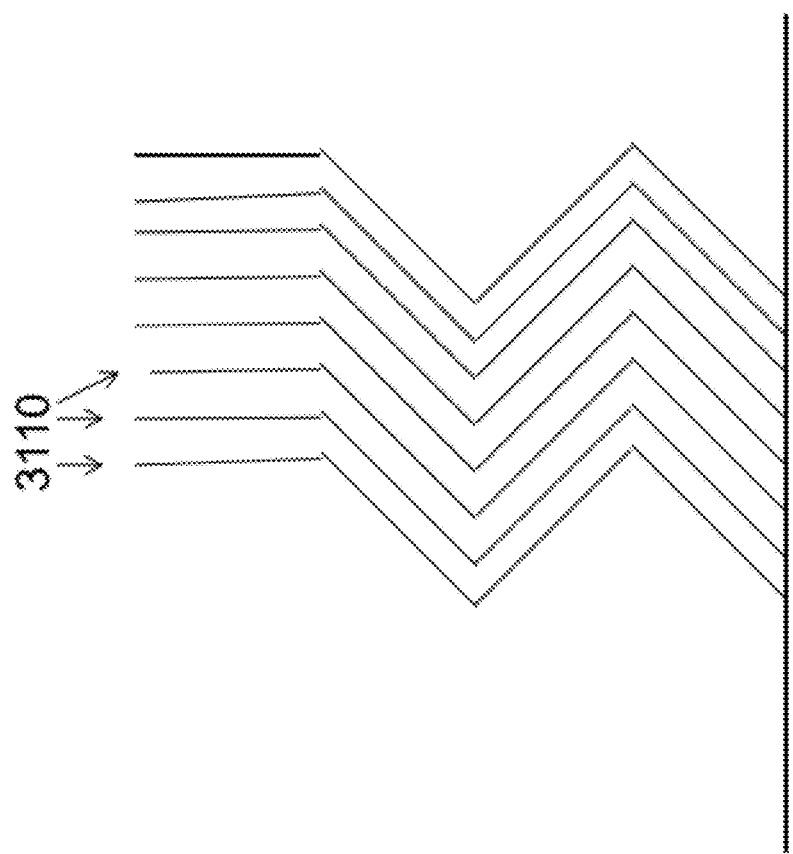
FIG. 31 is a schematic diagram that illustrates the alignment of a plurality of CNTs that are grown using an electric field that is varied in discrete steps.

It is expected that CNTs having controlled morphology can also be fabricated by growing the CNTs under conditions in which the direction of the electric field is deliberately controlled. The CNTs shown in FIG. 4 and FIG. 7 were prepared using an applied electric field that was oriented normal to the plane of the substrate during the entire PECVD growth process. As illustrated in FIG. 31 and FIG. 32, the electric field orientation relative to the substrate is varied during the PECVD growth process. In some embodiments, a carbon nanotube array having a plurality of mutually aligned nanotubes can be grown using the methods illustrated by FIG. 31 for one portion of the growth and using the methods illustrated by FIG. 32 for another portion of the growth. It is expected that the orientation of a length of a carbon nanotube array having a plurality of mutually aligned nanotubes relative to the surface of the conductive substrate will be controlled by controlling an orientation of the electric field relative to the surface of the conductive substrate during the growth process. It is expected that the optical properties of the CNT array can be tuned depending on the CNT morphology, or depending on the orientation of the CNT array relative to the propagation direction of the illumination that falls on the array. Absorbers prepared using the directed electric fields as illustrated in either or both of FIG. 31 and FIG. 32 are expected be used as polarizers where one polarization is selectively preferentially absorbed, e.g., if the CNTs are tilted by 45 degrees, it is expected that there would be different absorption of different polarizations of incoming light.

FIG. 31 is a schematic diagram that illustrates the alignment of a plurality of CNTs 3110 that are grown using an electric field that is varied in discrete steps. The CNTs 3110 have substantially aligned (or parallel) orientation in segments grown under the same conditions. In the embodiment shown in FIG. 31, an electric field is oriented in a plurality of linear piecewise orientations relative to a substrate. At the start of the growth process, the electric field is applied using orientations that can be described as being aligned along a sawtooth function relative to the surface of the substrate (that is, the electric field is tilted at one angle relative to the surface for a period of growth, and then is tipped at a different angle, such as the opposite angle relative to a normal to the surface of the substrate, for a following period of growth. In the embodiment of FIG. 31, the final portion of the CNT array is grown using an electric field that is normal to the surface of the substrate, and the CNTs that are grown during that period of growth are perpendicular to the surface of the substrate. As will be recognized, the tilt angle at any time can be selected over a range of angles, such as +45° to −45° in some plane perpendicular to the surface of the substrate. In addition, the plane in which the tilt angle is measured can also be rotated. In other word, the electric field can be applied along discrete orientations, such as along lines defined in the surface of a cone described about a normal to the substrate surface, rather than simply at angles defined in a single plane.

FIG. 32 is a schematic diagram that illustrates the alignment of a plurality of CNTs 3210 that are grown using an electric field that is varied continuously. The CNTs 3210 have substantially aligned orientation in segments grown under the same conditions. In the embodiment illustrated in FIG. 32, the electric field orientation relative to the surface of the substrate is varied in a sinusoidal manner. The CNTs that are grown have a sinusoidal morphology. It should be apparent that if the orientation of the electric field is varied both in angular measure relative to a normal to the surface of the substrate, and can also be rotated around a normal to the surface of the substrate, CNTs that have curvilinear structure, such as a corkscrew, are expected to be produced.

Optical Measurement Using Fieldspec Pro Spectroradiometer

Figure 10:
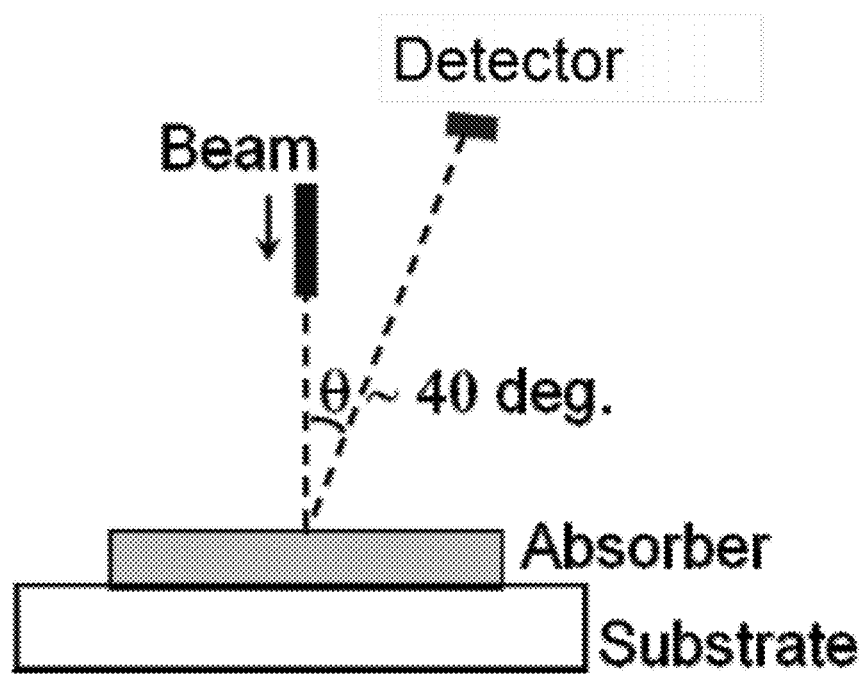
FIG. 10 is a diagram that illustrates a measurement set-up.

The optical measurements on the samples were conducted from λ~350 nm to 2500 nm using a high resolution, fiber coupled, spectroradiometer (Fieldspec Pro available from ASD Inc., 2555 55th Street, Suite 100, Boulder, Colo. 80301) where a standard white light beam was shone at normal incidence to the sample, as shown by the schematic in FIG. 10. The bare fiber connector of the spectroradiometer was oriented at ~40° from the normal. Relative reflectance spectra were obtained by first white referencing the spectroradiometer to a 99.99% reflective Spectralon™ panel. The reflected light intensity from the sample was then measured and the spectra compared for samples synthesized under different growth conditions.

Total Reflectance Measurement Using the Integrating Sphere

Figure 19:
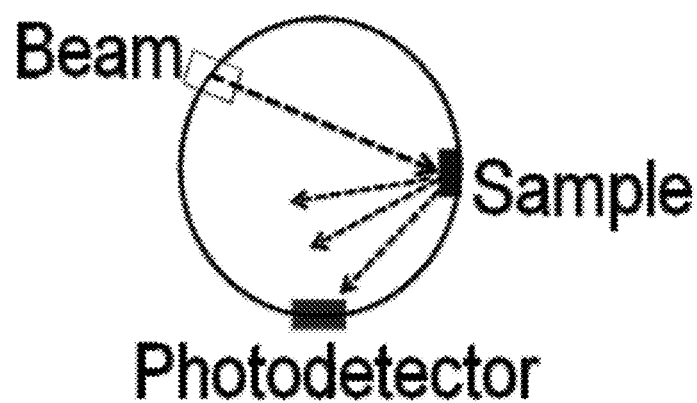
FIG. 19 shows a schematic of the total hemispherical reflectance measurement set-up.

The total reflectance of the CNT absorbers was measured using a 110 mm diameter integrating sphere with the Varian/Cary Diffuse Reflectance accessory, available from Agilent Technologies, 5301 Stevens Creek Blvd, Santa Clara Calif. 95051 (schematic shown in FIG. 19). The reflectance was normalized to the response obtained from a Spectralon™ PTFE standard coating (reflectance>99.99%) under identical conditions. Spectralon™ PTFE standard coating is available from Labsphere, Inc.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

REFERENCES

L. Hu and G. Chen, *Nano Lett.* 7, 3249 (2007).
K. Peng, Y. Wu, H. Fang, X. Zhong, Y. Xu, and J. Zhu, *Angew. Chem. Int. Ed.* 44, 2737 (2005).
Z-P. Yang, L. Ci, J. A. Bur, S-Y. Lin, and P. M. Ajayan, *Nano Lett.* 8, 446 (2008).
K. Mizuno, J. Ishii, H. Kishida, Y. Hayamizu, S. Yasuda, D. N. Futaba, M. Yumura, and K. Hata, *Proc. Natl. Acad. Sci. U.S.A.* 106, 6044 (2009).
Z. F. Ren, Z. P. Huang, J. W. Xu, J. H. Wang, P. Bush, M. P. Siegal, and P. N. Provencio, *Science* 282, 1105 (1998).
K. Hata, D. N. Futaba. K. Mizuno, T. Namai, M. Yumura, S. Iijima, *Science* 306, 1362 (2004).
T. Yamada, T. Namai, K. Haa, D. N. Futaba, K. Mizuno, J. Fan, M. Yudasaka, M. Yumura, S. Iijima, *Nat. Nanotechnol.* 1, 131 (2006).
G. D. Nessim, A. J. Hart, J. S. Kim, D. Acquaviva, J. M. Oh, C. D. Morgan, M. Seita, J. S. Leib, and C. V. Thompson, *Nano Lett.* 8, 3587-3593 (2008).
J. Weickert, R. B. Dunbar, H. C. Hesse, W. Wiedemann, and L. Schmidt-Mende, *Adv. Materials* 23, 1810 (2011).
R. R. Nair, P. Blake, A. N. Grigorenko, K. S. Novoselov, T. J. Booth, T. Stauber, N. M. R. Peres, and A. K. Geim, *Science* 320, 1308 (2008).
X. Yan, X. Cui, B. Li, and L-shi Li, *Nano Lett.* 10, 1869 (2010).
B. M. Kayes, H. A. Atwater, and N. S. Lewis, *J. Appl. Phys.* 97, 114302 (2005).
X Chen, and S. S. Mao, *Chem. Rev.* 107, 2891 (2007).
D. Derkacs, S. H. Lim, P. Matheu, W. Mar, and E. T. Yu, *Appl. Phys. Lett.* 89, 093103 (2006).
S. Fan, M. G. Chapline, N. R. Franklin, T. W. Tombler, A. M. Cassell, and H. Dai, *Science* 283, 512 (1999).
R. Andrews, D. Jacques, A. M. Rao, F. Derbyshire, D. Qian, X. Fan, E. C. Dickey, and J. Chen, *Chem. Phys. Lett.* 303, 467 (1999).
P. Eriksson, J. Y. Andersson, and G. Stemme, *Physica Scripta.* T54, 165 (1994).
J. H. Lehman, R. Deshpande, P. Rice, B. To, and A. C. Dillon, *Infrared Phys. and Tech.* 47, 246 (2006).
C. Nunes, V. Teixeira, M. Collares-Pereira, A. Monteiro, E. Roman, and J. Martin-Gago, *Vacuum* 67, 623 (2002).
Y. Murakami, S. Chiashi, Y. Miyauchi, S. Maruyama, *Jpn. J. Appl. Phys.* 43, 1221 (2004).
S. Sato, A. Kawabata, D. Kondo, M. Nihei, and Y. Awano, *Chem. Phys. Lett.* 402, 149 (2005).
D. J. Advena, V. T. Bly and J. T. Cox, *Appl. Opt.* 32, 1136 (1993).
C. E. Johnson, *Metal Finish.* 78, 21 (1980).
S. Kodama, M. Horiuchi, T. Kuni, and K. Kuroda, *IEEE Trans. Inst. and Meas.* 39, 230 (1990).
C. Lee, S. Bae, S. Mobasser, and H. Manohara, *Nano Lett.* 5, 2438 (2005).
J. Zhu, Z. Yu, G. F. Burkhard, C.-M Hsu, S. T. Connor, Y. Xu, Q. Wang, M. McGehee, S. Fan, and Y. Cui, *Nano Lett.* 9, 279 (2009).
M. Fox, *Optical properties of solids*. New York, N.Y.: Oxford University Press, 2001.
A. Arriagada, E. T. Yu, and P. R. Bandaru, *Journal of Thermal Analysis and calorimetry* 97, 1023 (2009).
T. de Los Arcos, P. Oelhafen, and D. Mathys, *Nanotechnology* 18, 265706 (2007).

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A monolithic optical absorber, comprising:
    a conductive substrate having a surface;
    a template layer in contact with said surface of said conductive substrate, said template layer having a template layer surface;
    a nucleation layer in contact with said surface of said template layer, said nucleation layer having a nucleation layer surface; and
    an optical absorber layer comprising a carbon nanotube array in contact with said nucleation layer surface, said carbon nanotube array having a plurality of mutually aligned nanotubes with a site density of at least $1 \times 10^{11}$ nanotubes/cm$^2$.

2. The monolithic optical absorber of claim 1, wherein said conductive substrate is a silicon wafer.

3. The monolithic optical absorber of claim 1, wherein said conductive substrate is a metal.

4. The monolithic optical absorber of claim 1, wherein said template layer comprises a refractory nitride.

5. The monolithic optical absorber of claim 1, wherein said template layer comprises NbTiN.

6. The monolithic optical absorber of claim 1, wherein said nucleation layer comprises Co and Ti.

7. The monolithic optical absorber of claim 1, wherein said monolithic optical absorber has a reflectivity of less than 1%.

8. The monolithic optical absorber of claim 1, wherein said monolithic optical absorber absorbs radiation in the wavelength range of 350 nm to 7000 nm.

9. The monolithic optical absorber of claim 1, wherein said monolithic optical absorber absorbs radiation in the wavelength range of 350 nm to 200,000 nm.

10. A method of manufacturing a monolithic optical absorber, comprising the steps of:
    providing a conductive substrate having a surface;
    depositing on said surface of said conductive substrate a template layer having a template layer surface;
    depositing on said surface of said template layer a nucleation layer having a nucleation layer surface; and
    using a plasma deposition method, growing an optical absorber layer comprising a plurality of mutually aligned carbon nanotubes with a site density of at least $1 \times 10^{11}$ nanotubes/cm$^2$ on said surface of said nucleation layer.

11. The method of manufacturing a monolithic optical absorber of claim 10, wherein said plasma deposition method is a plasma-assisted chemical vapor deposition method.

12. The method of manufacturing a monolithic optical absorber of claim 10, wherein said plasma deposition method includes the use of an electric field.

13. The method of manufacturing a monolithic optical absorber of claim 12, wherein an orientation of a length of said carbon nanotube array having a plurality of mutually aligned nanotubes relative to said surface of said conductive substrate is controlled by controlling an orientation of said electric field relative to said surface of said conductive substrate during the growing step.

14. The method of manufacturing a monolithic optical absorber of claim 10, wherein said conductive substrate is a silicon wafer.

15. The method of manufacturing a monolithic optical absorber of claim 10, wherein said conductive substrate is a metal.

16. The method of manufacturing a monolithic optical absorber of claim 10, wherein said template layer comprises a refractory nitride.

17. The method of manufacturing a monolithic optical absorber of claim 10, wherein said template layer comprises NbTiN.

18. The method of manufacturing a monolithic optical absorber of claim 10, wherein said nucleation layer comprises Co and Ti.

19. The method of manufacturing a monolithic optical absorber of claim 10, wherein a thickness of said nucleation layer is adjusted.

20. The method of manufacturing a monolithic optical absorber of claim 10, wherein said carbon nanotube array having a plurality of mutually aligned nanotubes has a site density in the range of $1 \times 10^{11}$ nanotubes/cm$^2$ to $1 \times 10^{12}$ nanotubes/cm$^2$.

* * * * *